United States Patent [19]

Coren

[11] 4,326,231

[45] Apr. 20, 1982

[54] CLIP-ON PROTECTOR

[76] Inventor: Gerald Coren, 18 Willben La., Plainview, N.Y. 11803

[21] Appl. No.: 245,501

[22] Filed: Mar. 19, 1981

Related U.S. Application Data

[63] Continuation of Ser. No. 49,801, Jun. 18, 1979, abandoned, and a continuation-in-part of Ser. No. 880,756, Feb. 24, 1978, Pat. No. 4,191,987.

[51] Int. Cl.[3] .............................................. H02H 9/04

[52] U.S. Cl. .................................... 361/119; 361/124; 361/120; 337/32; 337/34

[58] Field of Search ............... 361/119, 124, 120, 117, 361/118; 337/31, 32, 33, 34

[56] References Cited

U.S. PATENT DOCUMENTS 3,886,408 5/1975 Klayum et al. ................ 361/119 X 4,150,414 4/1979 Pagliuca ............................ 361/124

4,159,500 6/1979 Baumbach et al. ............ 361/124 X 4,191,987 3/1980 Coren ................................ 361/124

*Primary Examiner*—Patrick R. Salce

[57] ABSTRACT

A clip-on device for use with an over-voltage protector to protect telephones and other sensitive apparatus. The device comprises a housing in which is disposed in electrically insulated spaced array, electrical contact means and heat conduction means. Each of these means have portion external to the housing which detachably grasps the over-voltage protector. Movable elements disposed within the housing include electrically insulating fusible spacers. The housing clips onto the over-voltage protector and engages the respective electrodes thereof. A sustained overload condition causes the fusible spacers to fuse whereupon the movable elements operate to short the electrical contact means to ground.

4 Claims, 4 Drawing Figures

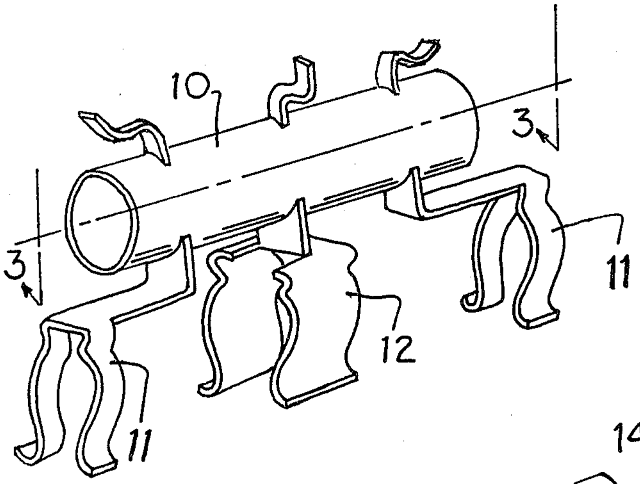
FIG. 1
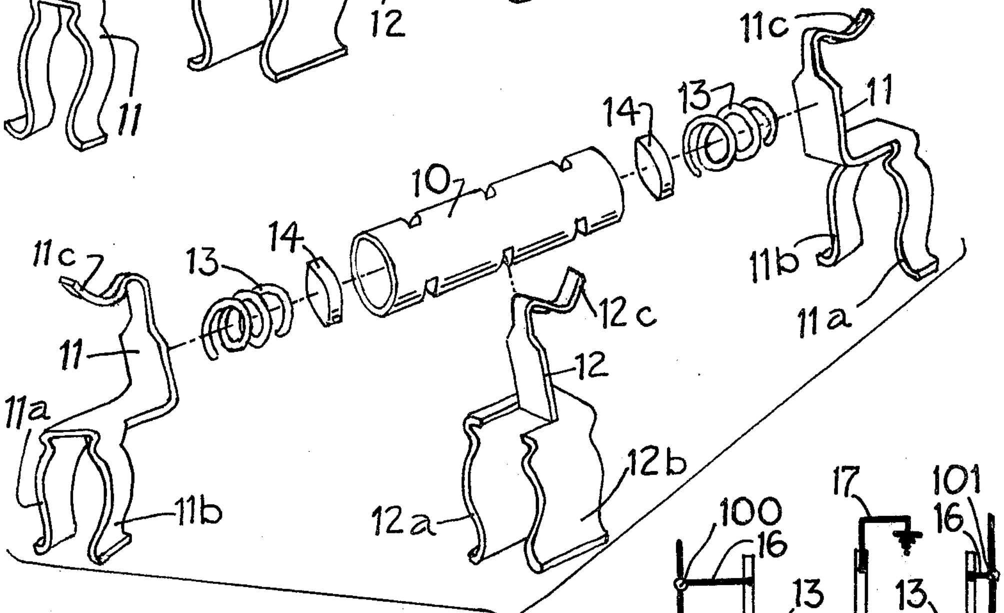
FIG. 2
FIG. 3
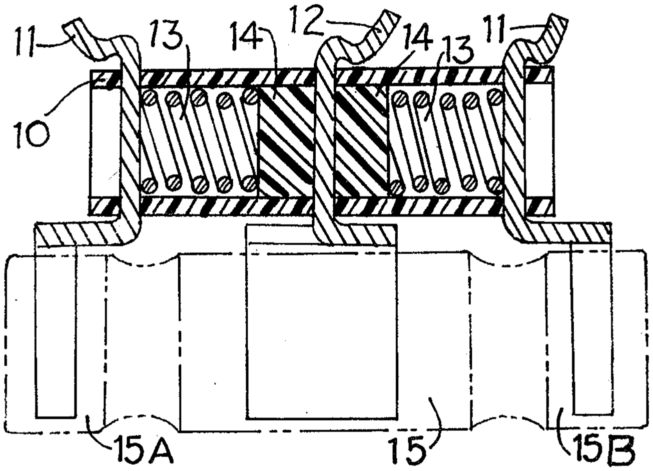
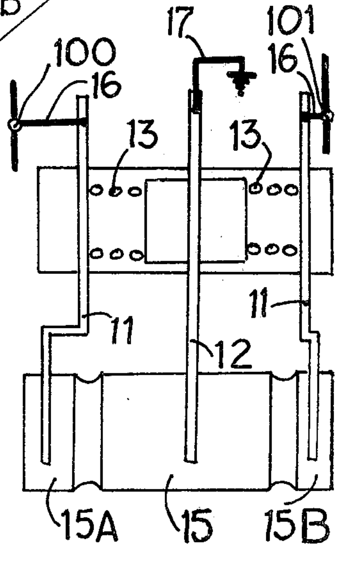
FIG. 4

CLIP-ON PROTECTOR

This is a continuation, of application Ser. No. 49,801, filed June 18, 1979, now abandoned and a Continuation-In-Part of application number 880,756 filed on Feb. 24, 1978; now U.S. Pat. No. 4,191,987.

This invention relates to equipment and methods for protecting apparatus from over-voltage conditions and is particularly directed to over-voltage sensitive devices attached to electrical conductors serving various types of apparatus such as used for communication. An example of the protection device's application is the device protecting apparatus from the effects of excessive voltage such as might occur because of lightning, a fault, contact by a high tension line and the like.

Of the various types of equipment presently employed for accomplishing the foregoing, each suffers from one or more disadvantages including excessive cost and size, lack of adaptability to existing protector terminals, maintenance difficulties, hazardous conditions during servicing, loss of function in the presence of sustained overload, and less-than-optimum reliability.

It is an object of this invention to overcome or substantially reduce the foregoing shortcomings and to this end the invention provides improvements in performance, utilization, materials and construction leading to reduction in size and cost, adaptability to existing mounting locations, reduction in hazards, ability to utilize the device in a densely packaged area, simplification and safety in servicing and an increase in reliability. Moreover, in the invention techniques, additional protection features are attained without significantly impairing the essential simplicity of the construction.

The invention consists of the novel methods, processes, parts, steps, combinations and improvements herein shown and described.

Serving to illustrate exemplary embodiments of the invention are the drawings of which:

FIG. 1 is an isometric view illustrating the invention;

FIG. 2 is the detail view of components taken in FIG. 1;

FIG. 3 is a sectional view taken along the line 3—3 of FIG. 1 and looking in the direction of the arrows to reveal the components of the device of FIG. 1;

FIG. 4 is a diagrammatic illustration of the inventive device in combination with an over-voltage protector.

Referring to the embodiment of FIGS. 1–3, the arrangement therein illustrated comprises a housing 10 constructed of a nonconducting material illustratively shown to be Bakelite and cylindrically shaped. Located in the housing in aligned relationship are two identical electrical transfer plates 11, one heat transfer plate 12, two springs 13 and two fusible spacers 14. The plates and springs are made of any suitable material such as beryllium copper or phosphor bronze. Electrical transfer plates 11 and heat transfer plate 12 are mounted through slots in the housing and held in place by deforming the connector tabs 11*c*, 12*c* on their respective plates, after their installation.

Electrical transfer plate 11 and heat transfer plate 12 each has a pair of spaced blades 11*a*, 11*b* and 12*a*, 12*b* respectively. Each pair of associated blades comprises a holding clip. The holding clips are aligned to receive and hold the over-voltage protector 15. In the embodiment illustrated in FIGS. 3–4 this over-voltage protector is of known construction; examples of which are an AEI type 16 gas tube protector, a TII-16 type surge arrester, a Siemens type TI-6350 surge voltage arrester. A cartridge of this type comprises a gas filled housing having a pair of opposed, spaced electrodes each of which makes electrical contact with one of the cartridge end terminals 15A and 15B. In the presence of an excessive voltage the gas between the electrodes is ionized thereby effectively shorting the end terminals and connecting them to the case of the protector and to external ground as described below. The lines and apparatus connected to these electrodes via the electrical transfer plates are thus short-circuited to thereby prevent the over-voltage condition from causing excessive current flow in the protected apparatus.

In the application of this device each of the electrical transfer plates 11 is connected to a different line terminal of the two line system and the heat transfer plate 12 is connected to external ground. These are illustratively accomplished by such means as connector receptacles which mate with the connector tabs 11*c*, 12*c* and allow each line terminal to be connected to the device through a different line wire 16 which is connected to one of the electrical transfer plates 11 and the ground wire 17 to be connected to heat transfer plate 12.

The fusible spacer may be epoxy glass or other appropriate insulating material of low melting temperature such as Tefzel (a trademark of the duPont Company and which is a modified copolymer of ethylene and tetrafluoroethylene) in accordance with ratings and installation requirements of the protector 15, the fusible spacer being designed to melt when the current rating of the over-voltage protector is exceeded. Each fusible spacer acts between a spring and the heat transfer plate in such a way that the distending of the spring to contact the heat transfer plate is prevented.

In FIG. 4 there is illustrated the combination of an over-voltage protector with the device. If an excessive voltage pulse exists at the line terminals 100 or 101 the current developed will be conducted to ground through the path consisting of its associated wire 16 to its associated electrical transfer plate 11, to its associated protector end terminal, then through the protector 15 which will ionize, to the protector case, through the heat transfer plate 12 and wire 17 to ground.

In the case of a prolonged over-voltage condition there is a possibility that the gas tube or other protective element will fail. If the element becomes an open circuit the apparatus and lines connected thereto are no longer protected. To eliminate this possibility the embodiment of FIG. 3 includes a shorting arrangement which provides an extra measure of safety and reliability as described hereinafter.

In event of a sustained excessive voltage the heat generated in the protector will be conducted by spaced blades 12*a*, 12*b* of the heat transfer plate 12 to the two fusible spacers 14. As excessive heat melts a fusible spacer, its compressed spring 13 expands. During this movement electrical contact between the spring and heat transfer plate is prevented by the insulation of the fusible spacer 14. Eventually, when the fusible spacer is melted, the spring contacts the heat transfer plate thus connecting line terminal 100 or 101 to ground through the path of its associated wire 16, electrical transfer plate 11, spring 13, heat transfer plate 12 and wire 17. In the illustrated use of this device there are two fusible spacers, each providing similar heat sensitive means and similar grounding means for said excessive voltage.

An important aspect of this device is its adaptability to existing terminals of presently utilized protectors, which may be removed from operation due to one or more undesirable deficiencies and may be replaced by this device without major installation costs. This device may be operated across existing circuit terminals which presently utilize an air gap type protector such as made by Cook Electric Company, Western Electric Company or Reliance Electric, with the air gap protector removed, since safety during prolonged overload is provided by its own fusible element and is not dependent upon the fusible element backup accompanying the air gap protector. This small mobile holder for the gas-filled over-voltage protector may be encapsulated with a protector using a potting material, Stycast 2651-40 or RTV-2 are suitable examples, with wires for its connection left exposed, and may be maneuvered and positioned into place so that it is quickly and easily connected to existing circuit terminals. Another important feature of this small device is its adaptability to existing home office equipment presently utilizing densely packaged gas-filled over-voltage protectors which operate without the use of any fusible safety elements, such as in the TII 700 block. Only a minor modification, consisting of removal of the existing block ground connection at each protector case and placing the ground onto the connector tab 12c of heat transfer plate 12, is necessary.

Ease of maintenance and safety of personnel is provided during the removal and replacement of the device after the fusible spacer has melted. Since the connector receptacles are insulated they may be grasped without fear of shock to quickly remove and replace the device without screw terminal connection.

It should be noted that the same benefits as described in the preceding paragraphs may be obtained if each spring is interchanged physically with its fusible spacer. In this way heat to melt each fusible spacer is obtained through its electrical transfer plate 11 instead of through the common heat transfer plate 12.

While only one embodiment of the present invention has been shown and described, it is to be understood that many changes and modifications can be made hereto without departing from the spirit and scope hereof.

What is claimed is:

1. A clip-on protection device for use with an over-voltage protector that is defined by spaced electrodes one of which is common or grounded, comprising a housing, contact means disposed in insulated spaced array in said housing, heat conduction means disposed in said housing and electrically insulated and spaced from said contact means, each of said contact means and heat conduction means including means extending from said housing and adapted detachably to engage the spaced electrodes of the protector such that said heat conduction means is in thermal and electrical communication with the grounded electrode of the protector and each of said contact means is in respective electrical communication with a line-electrode of the protector, and movable means disposed in said housing and adapted electrically to ground a respective one of said contact means, said movable means including fusible means in thermal contact with said heat conduction means such that movable means is normally electrically insulated from said heat conduction means until a sustained overload condition causes said fusible means to fuse whereupon said movable means engages said heat conduction means electrically to short said contact means to ground.

2. The device of claim 1, said contact means including two electrical transfer plates disposed in said housing, said movable means including two springs in pressured engagement with said fusible means, each of said springs prevented from electrically connecting an electrical transfer plate to said heat conduction means because said fusible spacer is interposed therebetween until a sustained overload fuses said fusible means whereupon one of said springs makes contact with said heat conduction means and with a respective one of said electrical plates shorting the same to ground.

3. A miniaturized protection device for a communications line and adapted for use with a gas tube protector that is defined by spaced electrodes one of which is common or grounded, comprising a housing of elongate shape, electrical transfer plate means disposed in insulated spaced array in said housing and adapted to be electrically connected to the communications line, heat conduction means disposed in said housing and adapted to be electrically connected to ground, the last-mentioned means being electrically insulated and spaced from said electrical transfer plate means, each of said electrical transfer plate means and heat conduction means including means extending from said housing and adapted detachably to engage the spaced electrodes of the gas tube such that each of said electrical transfer plate means is in electrical communication with an associated line-electrode of the gas tube, and said heat conduction means is in thermal and electrical contact with the grounded electrode of the gas tube, dielectric fusible means, and biasing means, each of said dielectric fusible means and biasing means disposed in said housing with the latter-mentioned means oriented to maintain the former-mentioned means in pressure engagement against said heat conduction means, said biasing means adapted to traverse a path that is substantially parallel to the longitudinal axis of said housing whereby when said dielectric fusible means fuses, said biasing means moves in a direction substantially along the longitudinal axis of said housing and operates to effect a short circuit between said electrical transfer plate means and said heat conduction means.

4. A miniaturized protection device for a communications line and adapted for use with a gas tube protector that is defined by spaced electrodes one of which is common or grounded, comprising an elongate housing formed with an axial bore, electrical transfer plate means disposed in insulated spaced array in said housing and adapted to be electrically connected to the communications line, heat conduction means disposed in said housing and adapted to be electrically connected to ground, the last-mentioned means being electrically insulated and spaced from said electrical transfer plate means, each of said electrical transfer plate means and heat conduction means including means extending from said housing and adapted detachably to engage the spaced electrodes of the gas tube such that each of said electrical transfer plate means is in electrical communication with an associated line-electrode of the gas tube, and said heat conduction means is in thermal and electrical communication with the grounded electrode of the gas tube, dielectric fusible means, and biasing means, each of said dielectric fusible means and biasing means being disposed in said axial bore with later-mentioned means oriented to maintain the former-mentioned means in pressure engagement against said heat conduction means, said axial bore being adapted to guide the movement of said biasing means on a path that is substantially along the longitudinal axis of said housing whereby when said dielectric fusible means fuses, said biasing means operates to effect a short circuit between said electrical transfer plate means and said heat conduction means.

* * * * *